(12) United States Patent
Toyama et al.

(10) Patent No.: US 10,502,175 B2
(45) Date of Patent: Dec. 10, 2019

(54) CONTROL DEVICE FOR INTERNAL COMBUSTION ENGINE AND METHOD OF ESTIMATING COMBUSTION CHAMBER-WALL TEMPERATURE OF INTERNAL COMBUSTION ENGINE

(71) Applicant: HITACHI AUTOMOTIVE SYSTEMS, LTD., Hitachinaka-shi, Ibaraki (JP)

(72) Inventors: Yuichi Toyama, Isesaki (JP); Shigeyuki Sakaguchi, Isesaki (JP); Atsushi Murai, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/760,654

(22) PCT Filed: Dec. 15, 2017

(86) PCT No.: PCT/JP2017/045192
§ 371 (c)(1),
(2) Date: Mar. 16, 2018

(87) PCT Pub. No.: WO2018/116994
PCT Pub. Date: Jun. 28, 2018

(65) Prior Publication Data
US 2019/0040836 A1 Feb. 7, 2019

(30) Foreign Application Priority Data

Dec. 19, 2016 (JP) .................. 2016-245667

(51) Int. Cl.
*F02D 41/12* (2006.01)
*F02P 5/04* (2006.01)
(Continued)

(52) U.S. Cl.
CPC .......... *F02P 5/045* (2013.01); *F02D 13/0234* (2013.01); *F02D 15/02* (2013.01);
(Continued)

(58) Field of Classification Search
CPC ... F02P 5/045; F02P 5/15; F02D 41/18; F02D 41/32; F02D 41/123; F02D 41/047;
(Continued)

(56) References Cited

U.S. PATENT DOCUMENTS 9,249,740 B2 * 2/2016 Matsuda ................. F02D 17/00
2017/0328296 A1 11/2017 Kamio et al.

FOREIGN PATENT DOCUMENTS

| JP | H07-071304 A | 3/1995 |
| JP | 2002-276446 A | 9/2002 |

(Continued)

*Primary Examiner* — Hai H Huynh
(74) *Attorney, Agent, or Firm* — Foley & Lardner LLP

(57) ABSTRACT

In a control device for an internal combustion engine and a method of estimating a combustion chamber-wall temperature of an internal combustion engine of the invention, a difference between a wall temperature of the combustion chamber and a cooling water temperature is set according to an integrated value of the intake air amount of the internal combustion engine after start of the fuel-cut, and the estimated value of the wall temperature of the combustion chamber during the fuel-cut is obtained based on the difference and the cooling water temperature.

9 Claims, 7 Drawing Sheets

(51) Int. Cl.
*F02D 15/02* (2006.01)
*F02D 41/32* (2006.01)
*F02P 5/15* (2006.01)
*F02D 13/02* (2006.01)
*F02D 41/18* (2006.01)
*F02D 35/02* (2006.01)
*F02D 41/04* (2006.01)
*F02D 41/00* (2006.01)

(52) U.S. Cl.
CPC ......... *F02D 35/026* (2013.01); *F02D 41/123* (2013.01); *F02D 41/18* (2013.01); *F02D 41/32* (2013.01); *F02P 5/15* (2013.01); *F02D 13/0238* (2013.01); *F02D 41/047* (2013.01); *F02D 2041/001* (2013.01); *F02D 2200/021* (2013.01); *F02D 2200/022* (2013.01); *F02D 2200/101* (2013.01)

(58) Field of Classification Search
CPC ............... F02D 35/026; F02D 13/0234; F02D 13/0238; F02D 15/02; F02D 2200/021; F02D 2200/022; F02D 2200/101; F02D 2041/001
USPC .................. 123/481, 435, 493; 701/110, 112
See application file for complete search history.

(56) References Cited

FOREIGN PATENT DOCUMENTS

| | | |
|---|---|---|
| JP | 2004-353490 A | 12/2004 |
| JP | 2007-278096 A | 10/2007 |
| JP | 2008-280914 A | 11/2008 |
| JP | 2012-026372 A | 2/2012 |
| JP | 2013-036391 A | 2/2013 |
| WO | WO-2016/084188 A1 | 6/2016 |

* cited by examiner

CONTROL DEVICE FOR INTERNAL COMBUSTION ENGINE AND METHOD OF ESTIMATING COMBUSTION CHAMBER-WALL TEMPERATURE OF INTERNAL COMBUSTION ENGINE

TECHNICAL FIELD

The present invention relates to a control device for an internal combustion engine and a method of estimating a combustion chamber-wall temperature of an internal combustion engine, and more particularly, relates to a technique for estimating a wall temperature of a combustion chamber during fuel-cut in a deceleration operation of an internal combustion engine.

BACKGROUND ART

Patent Document 1 discloses a control system for an internal combustion engine that estimates the temperature of a wall surface of a cylinder from an integrated value of intake air amount after starting the engine, shifts an ignition timing to an advanced side of the minimum advance for the best torque (MBT) in a case in which an estimated value of the temperature of the wall surface is lower than a threshold, and shifts the ignition timing to a retarded side of MBT in a case in which the estimated value of the temperature of the wall surface is equal to or greater than the threshold.

REFERENCE DOCUMENT LIST

Patent Document

Patent Document 1: JP 2008-280914A

SUMMARY OF THE INVENTION

Problem to be Solved by the Invention

There is a case in which fuel-cut for stopping the supply of fuel to a combustion chamber is performed in a deceleration operation of an internal combustion engine for an automobile. Thus, combustion is stopped during the fuel-cut, so that the wall temperature of the combustion chamber decreases.

In a case in which the degree of decrease of the wall temperature caused by the fuel-cut is estimated based on an integrated value of the intake air amount from the start of the fuel-cut, the duration of the fuel-cut, or the like, an estimated error is increased depending on a condition, such as a cooling water temperature. Thus, there is a problem that it may be difficult to perform combustion control, such as ignition timing control, with high accuracy according to the wall temperature of the combustion chamber in a case in which the supply of fuel is restarted after the fuel-cut.

The invention has been made in consideration of the above-mentioned problem, and an object of the invention is to provide a control device for an internal combustion engine and a method of estimating a combustion chamber-wall temperature of an internal combustion engine that can estimate the wall temperature of a combustion chamber during fuel-cut with high accuracy.

Means for Solving the Problem

A control device for an internal combustion engine according to an aspect of the invention includes a fuel-cut unit that performs fuel-cut for stopping supply of fuel to a combustion chamber in a deceleration operation of an internal combustion engine, a wall temperature estimating unit that estimates a wall temperature of the combustion chamber, and a combustion control unit that controls combustion of the internal combustion engine based on an estimated value of the wall temperature of the combustion chamber. The wall temperature estimating unit sets a difference between a wall temperature of the combustion chamber and a cooling water temperature according to an integrated value of the intake air amount of the internal combustion engine after start of the fuel-cut, and obtains the estimated value of the wall temperature of the combustion chamber during the fuel-cut based on the difference and the cooling water temperature.

Furthermore, a method of estimating a combustion chamber-wall temperature of an internal combustion engine according to another aspect of the invention includes a step of measuring a cooling water temperature of an internal combustion engine, a step of measuring the intake air amount of the internal combustion engine, a step of estimating a wall temperature of a combustion chamber during a combustion operation of the internal combustion engine, a step of performing fuel-cut for stopping supply of fuel to the combustion chamber in a deceleration operation of the internal combustion engine, a step of obtaining a difference between an estimated value of the wall temperature of the combustion chamber at the time of starting the fuel-cut and the cooling water temperature, a step of obtaining an integrated value of the intake air amount after starting the fuel-cut, a step of reducing data of the difference according to an increase in the integrated value, and a step of obtaining an estimated value of the wall temperature of the combustion chamber during the fuel-cut based on a measured value of the cooling water temperature and the data of the difference.

Effects of the Invention

According to the invention, a difference between the wall temperature of the combustion chamber and the cooling water temperature is changed during fuel-cut in correlation with an integrated value of the intake air amount. Accordingly, it is possible to estimate the wall temperature of the combustion chamber during fuel-cut with high accuracy, and it is possible to improve the operability of the internal combustion engine by appropriately performing combustion control according to the wall temperature of the combustion chamber in a case in which the fuel supply (combustion) is restarted after the fuel-cut.

MODE FOR CARRYING OUT THE INVENTION

An embodiment of the invention will be described below.

Figure 1:
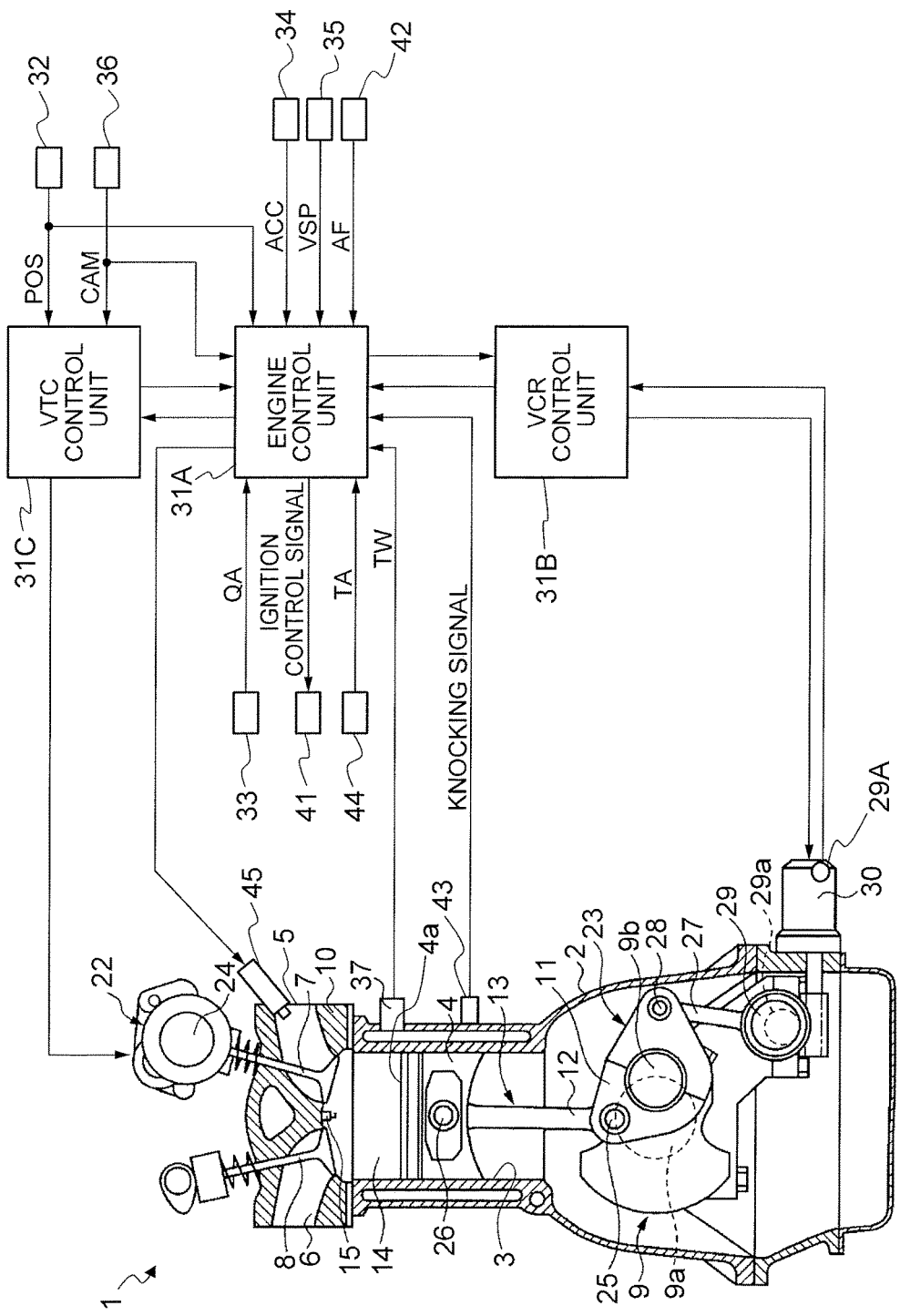
FIG. 1 is a view illustrating the configuration of an internal combustion engine according to an embodiment of the invention.

FIG. 1 illustrates an aspect of an internal combustion engine for a vehicle to which a control device and a method of estimating a combustion chamber-wall temperature of the invention are applied.

An internal combustion engine 1 for a vehicle illustrated in FIG. 1 includes a cylinder block 2, a piston 4 that is provided in each of cylinder bores 3 formed in cylinder block 2, a cylinder head 10 at which intake ports 5 and exhaust ports 6 are formed, and for each cylinder, a pair of intake valves 7, 7 that opens and closes opening ends of intake ports 5 and a pair of exhaust valves 8, 8 that opens and closes opening ends of exhaust ports 6 are provided.

Each piston 4 is connected to a crankshaft 9 by a connecting rod 13 that includes a lower link 11 and an upper link 12.

Furthermore, a combustion chamber 14 is formed between a crown 4a of each piston 4 and the lower surface of cylinder head 10. An ignition plug 15 is provided substantially at the center of each combustion chamber 14 which is formed by cylinder head 10.

Ignition plug 15 ignites and combusts an air-fuel mixture by spark discharge through the supply of high voltage from an ignition coil 41, and the ignition timing of ignition plug 15 is controlled by a timing at which the high voltage is supplied from ignition coil 41.

Furthermore, internal combustion engine 1 includes a valve timing control system (VTC) 22 that can vary phases of the opening periods of intake valves 7 and 7 with respect to crankshaft 9, and a variable compression ratio mechanism (VCR) 23 that can vary a mechanical compression ratio by changing the position of the top dead center of each piston 4 (the volume of each combustion chamber).

Valve timing control system 22 is a mechanism that changes the phase (control variable) of an intake cam shaft 24 with respect to crankshaft 9 to continuously advance and retard the center phases of the operation angles of intake valves 7 and 7 while making the operation angles of intake valves 7 and 7 constant.

As valve timing control system 22, an electric valve timing control system, which adjusts the relative rotational phase angle of intake cam shaft 24 with respect to crankshaft 9 by an electric motor as disclosed in, for example, JP 2013-036391A, can be used.

However, valve timing control system 22 is not limited to a mechanism of which an actuator is an electric motor, and a known mechanism using a hydraulic actuator or the like can be appropriately employed.

Variable compression ratio mechanism 23 is a mechanism that varies the mechanical compression ratio of internal combustion engine 1 by changing the position of the top dead center TDC of each piston 4 with a structure disclosed in, for example, JP 2002-276446A.

An example of the structure of variable compression ratio mechanism 23 will be described below.

Crankshaft 9 includes a plurality of journal portions 9a and a plurality of crank pin portions 9b, and journal portions 9a are rotatably supported by main bearings of cylinder block 2.

Crank pin portion 9b is eccentric from journal portion 9a, and lower link 11 is rotatably connected to crank pin portion 9b.

Lower link 11 is adapted to be divided into two pieces, and crank pin portion 9b is fitted to a connecting hole provided substantially at the center of lower link 11.

The lower end side of upper link 12 is connected to one end of lower link 11 by a connecting pin 25 so as to be rotationally movable, and the upper end side of upper link 12 is connected to piston 4 by a piston pin 26 so as to be rotationally movable.

The upper end side of a control link 27 is connected to the other end of lower link 11 by a connecting pin 28 so as to be rotationally movable, and the lower end side of control link 27 is connected to the lower portion of cylinder block 2 through a control shaft 29 so as to be rotationally movable.

In detail, control shaft 29 includes an eccentric cam portion 29a that is rotatably supported by an internal combustion engine body (cylinder block 2) and is eccentric from the center of rotation of control shaft 29, and the lower end portion of control link 27 is rotatably fitted to eccentric cam portion 29a.

The rotational movement position of control shaft 29 is controlled by a compression ratio control actuator 30 using an electric motor.

In variable compression ratio mechanism 23 using the above-mentioned multi-link piston-crank mechanism, the central position of eccentric cam portion 29a, that is, the position of eccentric cam portion 29a relative to the internal combustion engine body (cylinder block 2) is changed in a case in which control shaft 29 is rotationally moved by compression ratio control actuator 30.

Accordingly, in a case in which the oscillation-support position of control link 27 is changed due to the change of the oscillation-support position of the lower end of control link 27, the position of piston 4 at the piston top dead center (TDC) is raised or lowered due to the change of the stroke of piston 4. As a result, the mechanical compression ratio of internal combustion engine 1 is changed.

That is, the position of piston 4 at the top dead center (the volume of the combustion chamber) is changed according to the angular position of control shaft 29, so that the mechanical compression ratio of internal combustion engine 1 is changed.

Ignition coils 41, fuel injection valves 45 that inject fuel into intake ports 5, and the like are controlled by an engine control unit 31A; variable compression ratio mechanism 23 is controlled by a VCR control unit 31B; and valve timing control system 22 is controlled by a VTC control unit 31C.

Here, a variable compression ratio device is made up of variable compression ratio mechanism 23 and VCR control unit 31B, and a variable valve device is made up of valve timing control system 22 and VTC control unit 31C.

Engine control unit 31A, VCR control unit 31B, and VTC control unit 31C are integrated; and ignition coil 41, fuel injection valve 45, variable compression ratio mechanism 23, valve timing control system 22, and the like can be controlled by one control unit.

Furthermore, internal combustion engine 1 illustrated in FIG. 1 is a so-called port injection type internal combustion engine that injects fuel into intake ports 5, or may be a cylinder direct injection type internal combustion engine that directly injects fuel into combustion chambers 14.

Each of engine control unit 31A, VCR control unit 31B, and VTC control unit 31C includes a microcomputer that includes a processor (CPU), a memory, and the like; and engine control unit 31A, VCR control unit 31B, and VTC control unit 31C are connected so as to be capable of communicating thereamong by a controller area network (CAN) 43.

Furthermore, engine control unit 31A computes a target compression ratio of variable compression ratio mechanism 23 and a target phase conversion angle (target advance value) of valve timing control system 22 based on the operating state of internal combustion engine 1, transmits the data of the target compression ratio to VCR control unit 31B, and transmits the data of the target phase conversion angle to VTC control unit 31C.

The data of the target compression ratio (in other words, the data of a target angular position of control shaft 29) transmitted from engine control unit 31A is input to VCR control unit 31B, and an output signal of an angle sensor 29A, which detects the angular position of control shaft 29 (in other words, an actual compression ratio), is input to VCR control unit 31B.

Then, VCR control unit 31B performs the feedback control of a compression ratio for computing and outputting the operation amount of actuator 30 so that the angular position of control shaft 29 to be detected by angle sensor 29A approaches a target angular position corresponding to the target compression ratio.

Furthermore, the data of the target phase conversion angle transmitted from engine control unit 31A is input to VTC control unit 31C, and an output signal (crank angle signal) POS of a crank angle sensor 32, which detects the angular position of crankshaft 9, and an output signal (cam angle signal) CAM of a cam angle sensor 36, which detects the angular position of intake cam shaft 24, are input to VTC control unit 31C.

Then, VTC control unit 31C performs the feedback control of a valve timing for measuring the relative rotational phase angle (actual phase conversion angle) of intake cam shaft 24 with respect to crankshaft 9 from the output signal POS of crank angle sensor 32 and the output signal CAM of cam angle sensor 36 and computing and outputting the operation amount of the actuator of valve timing control system 22 so that the measured relative rotational phase angle approaches a target phase conversion angle.

VCR control unit 31B outputs information about the angular position of control shaft 29, which is detected based on the output of angle sensor 29A, (in other words, information about an actual compression ratio) to engine control unit 31A, and VTC control unit 31C outputs information about the relative rotational phase angle (actual phase conversion angle) of intake cam shaft 24 with respect to crankshaft 9, which is measured based on the outputs of crank angle sensor 32 and cam angle sensor 36, to engine control unit 31A.

The outputs of crank angle sensor 32 and cam angle sensor 36 are input to both engine control unit 31A and VTC control unit 31C. Furthermore, the output of angle sensor 29A can be input to both engine control unit 31A and VCR control unit 31B.

Furthermore, signals are input to engine control unit 31A. These signals include a signal output from an air flow sensor 33 for measuring the intake air flow rate QA of internal combustion engine 1, a signal output from an accelerator opening sensor 34 for measuring a depression amount ACC of an accelerator pedal (accelerator opening), a signal output from a vehicle speed sensor 35 for measuring a traveling speed (vehicle speed) VSP of a vehicle on which internal combustion engine 1 is mounted, a signal output from a water temperature sensor 37 for measuring a cooling water temperature TW of internal combustion engine 1, a signal output from an air-fuel ratio sensor 42 for measuring an air-fuel ratio AF through the concentration of oxygen contained in the exhaust gas, a signal output from a knocking sensor 43 for detecting vibration caused by knocking, and the like.

Furthermore, engine control unit 31A computes the amount of fuel to be supplied to internal combustion engine 1 (the amount of fuel to be injected by the fuel injection valve), the ignition timing of ignition plug 15, and the like based on detection signals of the various sensors; outputs an injection pulse signal to the fuel injection valve; and outputs a current application-control pulse signal of ignition coil 41.

Furthermore, as software, engine control unit 31A has a function (fuel-cut unit) to perform fuel-cut (for cutting off the supply of fuel to combustion chamber 14) for stopping the injection of fuel from fuel injection valve 45 in a case in which a predetermined condition is satisfied in the deceleration operation of internal combustion engine 1.

Furthermore, as software, engine control unit 31A has a function as a wall temperature estimating unit, which estimates the wall temperature of combustion chamber 14 of internal combustion engine 1 based on the operating condition of internal combustion engine 1, and performs combustion control for changing an ignition timing or the amount of fuel to be supplied according to the estimated value of the wall temperature of combustion chamber 14.

In the combustion operating state of internal combustion engine 1, engine control unit 31A estimates the wall temperature of combustion chamber 14 based on, for example, a cooling water temperature TW at the time of starting internal combustion engine 1, an integrated value of the intake air amount (an integrated value of the amount of fuel to be injected), an engine load, an engine speed, and the like.

Furthermore, engine control unit 31A estimates the wall temperature of combustion chamber 14 based on, for example, an elapsed time after stopping internal combustion engine 1, a cooling water temperature at that time, or the like in a case in which idling stop (idling reduction) for temporarily stopping internal combustion engine 1 is performed in a state in which a vehicle waits for the signal change at a traffic intersection or the like.

In a fuel-cut state during a deceleration operation, combustion is stopped by fuel-cut but internal combustion engine 1 is driven and the opening and closing of intake and exhaust valves 7 and 8 are continued to perform the intake stroke and the exhaust stroke by the pistons. Accordingly, the wall temperature of combustion chamber 14 is changed with characteristics different from the characteristics of all of the combustion operating state and an idling stop state.

For this reason, engine control unit 31A performs estimation processing, which is suitable for the fuel-cut state, to estimate the wall temperature of combustion chamber 14 in the fuel-cut state; estimates a change in a combustion chamber-wall temperature after restarting the fuel injection while using the wall temperature estimated in the fuel-cut state as an initial value in a case in which combustion (fuel injection and ignition) is restarted from the fuel-cut state; and changes an ignition timing, the amount of fuel to be injected, or the like based on the estimated value of the wall temperature.

Processing for estimating the wall temperature of combustion chamber 14 in the fuel-cut state (fuel-cut in vehicle deceleration), which is performed by engine control unit 31A, will be described in detail below with reference to a flowchart of FIG. 2.

In Step S101, engine control unit 31A determines whether or not fuel-cut is being performed.

Then, if fuel-cut is not being performed, engine control unit 31A ends this routine without performing processing for estimating the wall temperature during the fuel-cut.

If fuel-cut is not being performed, as described above, engine control unit 31A switches a method of estimating a combustion chamber-wall temperature (the quantity of state used for estimation) to perform the estimation of the wall temperature of combustion chamber 14 according to an operation pattern at the time of engine start, at the time of departure, during vehicle travel at a constant speed, during acceleration, during idling stop, at time of restarting the engine from idling stop, or the like.

However, engine control unit 31A can appropriately include a known method as a method of estimating the wall temperature of combustion chamber 14 in a state other than the fuel-cut state.

On the other hand, if fuel-cut is being performed, in engine control unit 31A, the routine proceeds to Step S102.

In Step S102, engine control unit 31A sets a difference CCSTETW (° C.) that is used to obtain a wall temperature estimated value of combustion chamber 14 CCSTE (° C.) based on a measured value TW (° C.) of a cooling water temperature.

Engine control unit 31A sets difference CCSTETW based on a difference FCFCSMW (FCFCSMW=CCSTE−TW) between a wall temperature estimated value CCSTE at the time of start of fuel-cut (in other words, a wall temperature estimated value in a combustion operating state before the start of fuel-cut) and a measured value TW of a cooling water temperature at the time of start of fuel-cut, and an integrated value QMINT of a measured value QA of the intake air amount after the start of fuel-cut.

Figure 2:
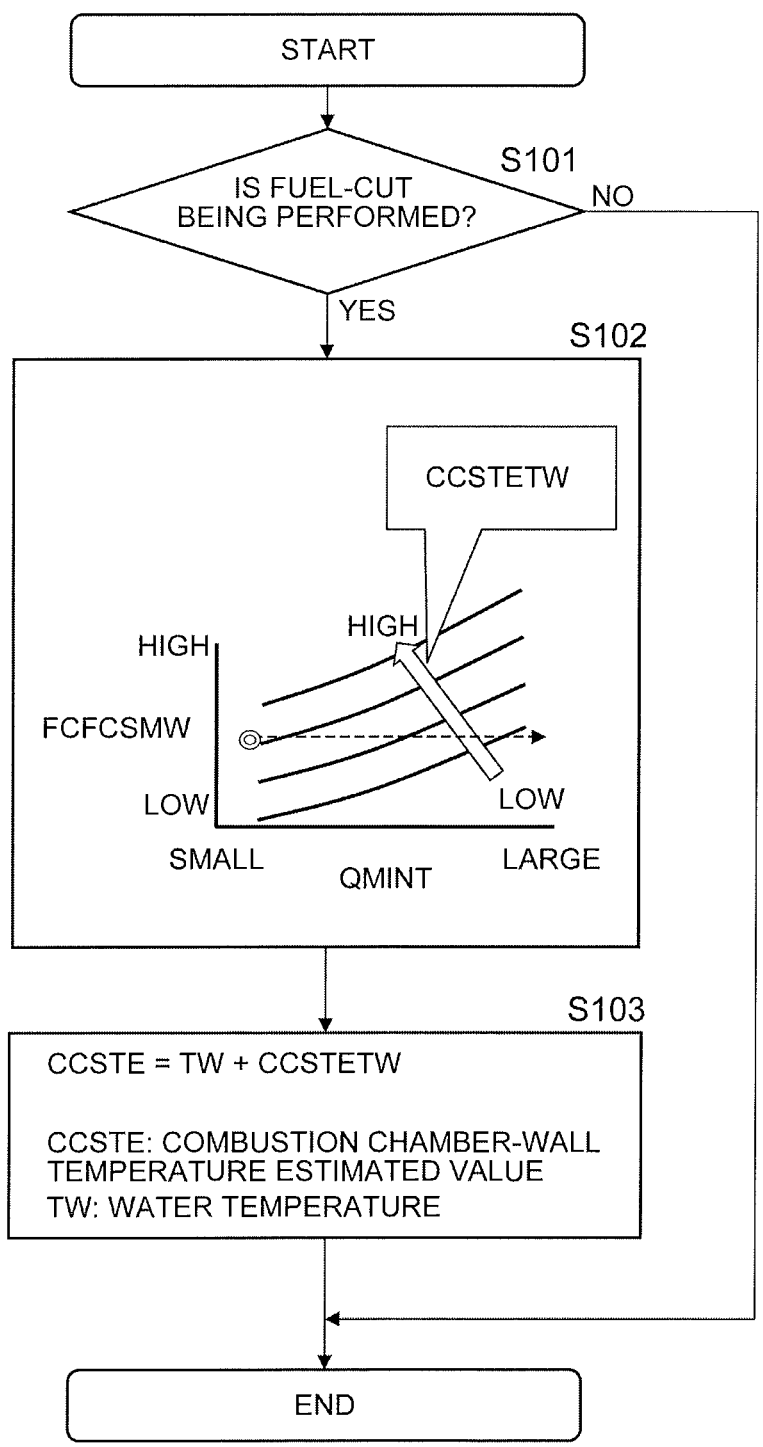
FIG. 2 is a flowchart illustrating processing for estimating a combustion chamber-wall temperature in a fuel-cut state in the embodiment of the invention.

Here, as illustrated in a graph of Step S102 of FIG. 2, engine control unit 31A sets difference CCSTETW to a greater value as difference FCFCSMW is greater, that is, as the wall temperature of combustion chamber 14 is greater than the cooling water temperature at the time of start of fuel-cut, and changes difference CCSTETW to a smaller value as integrated value QMINT is increased.

Then, the routine proceeds to Step S103, and engine control unit 31A sets a value, which is obtained by adding difference CCSTETW set in Step S102 to measured value TW of the cooling water temperature, as combustion chamber-wall temperature estimated value CCSTE (CCSTE=CCSTETW+TW).

That is, since characteristics in which a combustion chamber-wall temperature is lowered with respect to an increase in integrated value QMINT thereafter are previously made to be suitable for every difference between a combustion chamber-wall temperature and the cooling water temperature at the time of start of fuel-cut, engine control unit 31A estimates a change in which a combustion chamber-wall temperature gradually approaches the cooling water temperature during fuel-cut with reference to the characteristics and sets estimated value CCSTE.

Figure 3:
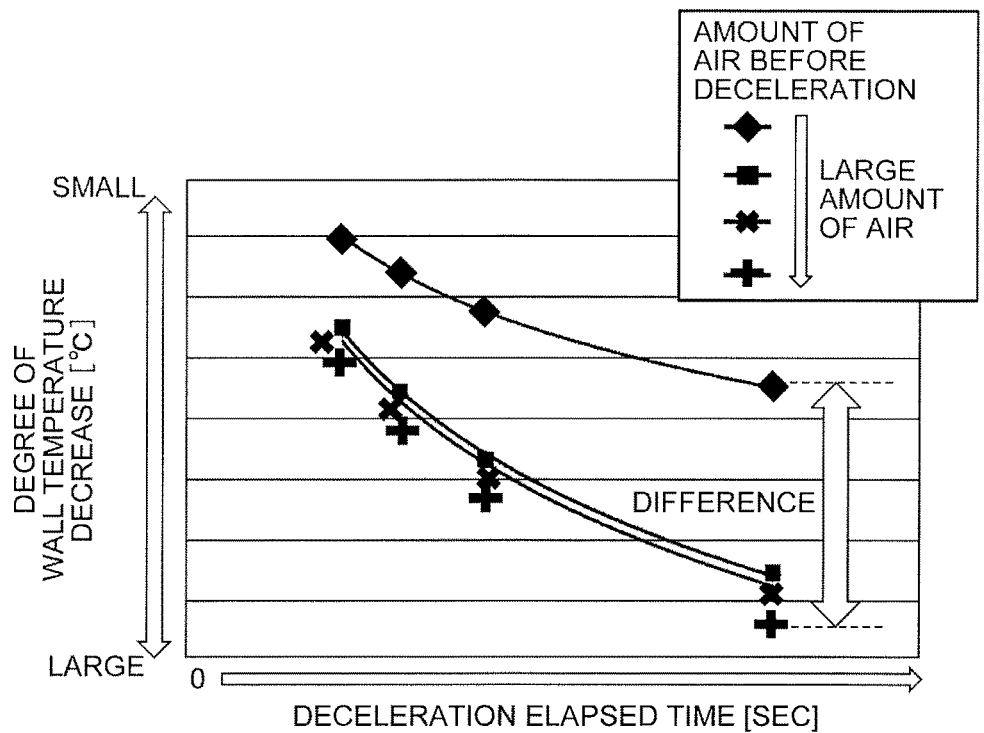
FIG. 3 is a graph illustrating a correlation between time, which has elapsed after starting fuel-cut, and the degree of decrease of a combustion chamber-wall temperature in the embodiment of the invention.

As illustrated in FIG. 3, in a case in which the intake air amount (a combustion chamber-wall temperature, an engine load) before fuel-cut varies, the degree of decrease of a combustion chamber-wall temperature with respect to time having elapsed after the start of fuel-cut varies. Accordingly, in a case in which the degree of decrease of a combustion chamber-wall temperature is uniformly set based on the time having elapsed after the start of fuel-cut, an estimated error of a combustion chamber-wall temperature during fuel-cut is increased.

Figure 4:
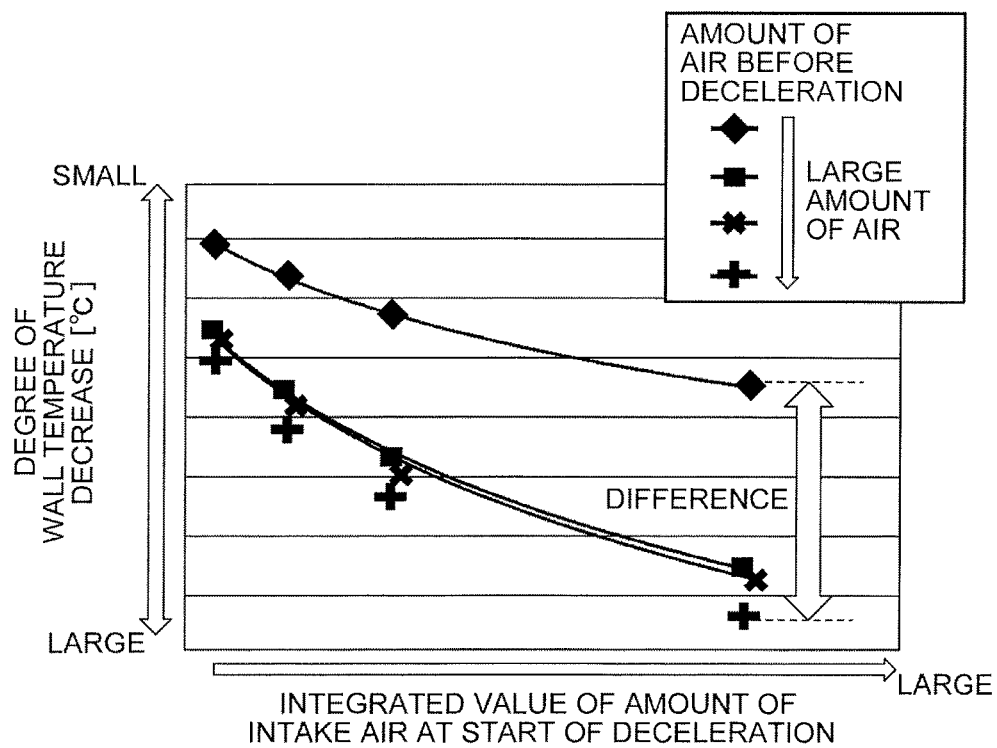
FIG. 4 is a graph illustrating a correlation between an integrated value of the intake air amount after starting the fuel-cut and the degree of decrease of a combustion chamber-wall temperature in the embodiment of the invention.

Furthermore, as illustrated in FIG. 4, in a case in which the intake air amount (a combustion chamber-wall temperature, an engine load) before fuel-cut varies, the degree of decrease of a combustion chamber-wall temperature with respect to an integrated value of the intake air amount after the start of fuel-cut varies. Accordingly, in a case in which the degree of decrease of a combustion chamber-wall temperature is uniformly set based on the integrated value of the intake air amount after the start of fuel-cut, an estimated error of a combustion chamber-wall temperature during fuel-cut is increased.

Figure 5:
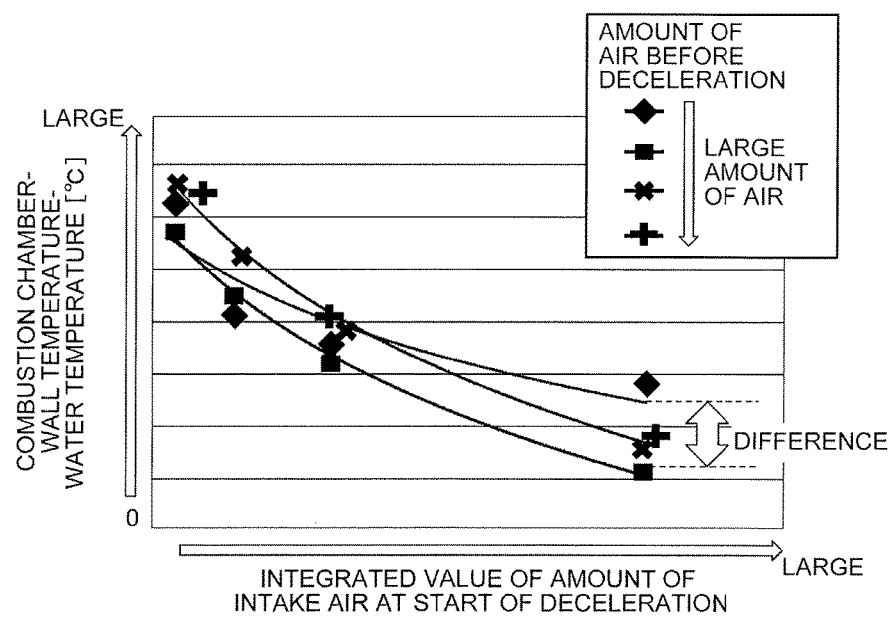
FIG. 5 is a graph illustrating a correlation between an integrated value of the intake air amount after starting of the fuel-cut and a difference between a combustion chamber-wall temperature and a cooling water temperature in the embodiment of the invention.

On the other hand, as illustrated in FIG. 5, a correlation between a difference between a combustion chamber-wall temperature and a cooling water temperature and an integrated value of the intake air amount after the start of fuel-cut is substantially constant even though the intake air amount (a combustion chamber-wall temperature, an engine load) before fuel-cut varies. Accordingly, in a case in which a change in a difference between a combustion chamber-wall temperature and a cooling water temperature is estimated based on the integrated value of the intake air amount after the start of fuel-cut, a combustion chamber-wall temperature during fuel-cut can be estimated with high accuracy.

Then, engine control unit 31A can advance an ignition timing as much as possible while suppressing the occurrence of abnormal combustion, such as knocking, by setting an ignition timing based on combustion chamber-wall temperature estimated value CCSTE in a case in which the supply of fuel is restarted from the fuel-cut state. As a result, the fuel consumption performance of internal combustion engine 1 is improved.

For example, in a case in which engine control unit 31A sets an ignition timing based on a cooling water temperature, engine control unit 31A and shifts an ignition timing to the retarded side to ensure a sufficient allowance so that the occurrence of abnormal combustion, such as knocking, can be suppressed even though a difference between a cooling water temperature and a combustion chamber-wall temperature varies.

In a case in which engine control unit 31A sets an ignition timing based on combustion chamber-wall temperature estimated value CCSTE, engine control unit 31A can shift an ignition timing to a side closer to the advanced side by reducing the allowance since a combustion chamber-wall temperature is directly correlated with the ease of occurrence of abnormal combustion. Accordingly, the thermal efficiency of internal combustion engine 1 is improved, so that fuel consumption performance is improved.

Moreover, since engine control unit 31A can shift an ignition timing to a side closer to the advance side in a case in which the accuracy of the estimation of a combustion chamber-wall temperature is high, an effect of improving fuel consumption performance can be maximized.

Furthermore, if engine control unit 31A corrects the amount of fuel to be injected based on combustion chamber-wall temperature estimated value CCSTE in a case in which the supply of fuel is restarted from the fuel-cut state, the deviation of an air-fuel ratio from a target can be suppressed even though the amount of fuel adhering to intake port 5 is changed according to a combustion chamber-wall temperature. Accordingly, the exhaust properties, fuel consumption, acceleration performance, and the like of internal combustion engine 1 can be improved.

Here, engine control unit 31A can correct estimated value CCSTE based on conditions other than a cooling water temperature TW and an integrated value QMINT of the intake air amount in order to further improve the accuracy of the estimation of a combustion chamber-wall temperature.

Figure 6:
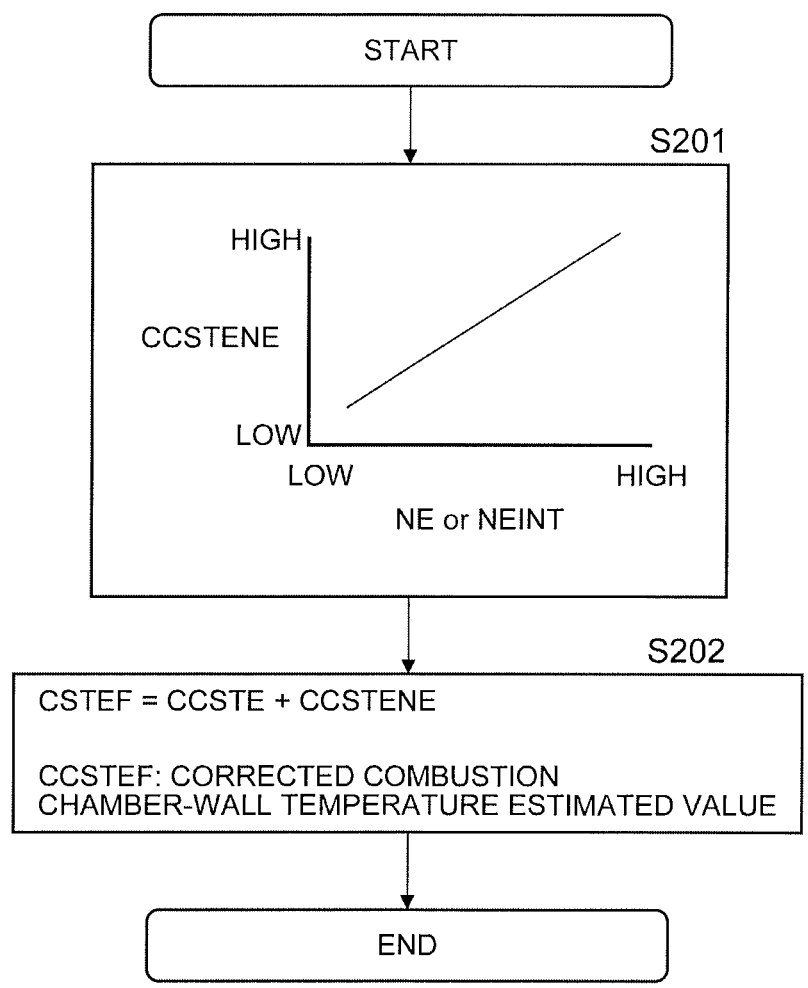
FIG. 6 is a flowchart illustrating processing for correcting an estimated value of a combustion chamber-wall temperature according to an engine speed NE in the embodiment of the invention.

A flowchart of FIG. 6 illustrates processing for correcting wall temperature estimated value CCSTE according to the rotational speed of internal combustion engine 1 by engine control unit 31A.

In Step S201, engine control unit 31A sets a first correction value CCSTENE (CCSTENE (° C.)>0) based on rotational speed NE (rpm) of internal combustion engine 1 or an engine speed-integrated value NEINT.

Engine speed-integrated value NEINT is the quantity of state that represents the number of rotations of internal combustion engine 1 from the start of fuel-cut.

Here, engine control unit 31A corrects estimated value CCSTE to a greater value by setting first correction value CCSTENE to a greater value as rotational speed NE (rpm) is higher and setting first correction value CCSTENE to a greater value as engine speed-integrated value NEINT is greater.

The reason for the abovementioned correction is that combustion is stopped during fuel-cut but the heat of compression is generated in the compression stroke and it is more difficult for a combustion chamber-wall temperature to be lowered as the generation frequency of the heat of compression is higher.

As the rotational speed during fuel-cut is higher, the rate of increase of engine speed-integrated value NEINT is increased. Accordingly, in a case in which first correction value CCSTENE is set based on engine speed-integrated value NEINT, first correction value CCSTENE is set to a greater value as rotational speed NE is higher.

In a case in which engine control unit 31A sets first correction value CCSTENE in Step S201, the routine proceeds to Step S202 and engine control unit 31A sets the result of the addition of first correction value CCSTENE to wall temperature estimated value CCSTE as a corrected estimated value CCSTEF (CCSTEF=CCSTE+CCSTENE) based on rotational speed NE.

Since engine control unit 31A corrects estimated value CCSTE according to rotational speed NE of internal combustion engine 1 in this way, engine control unit 31A can estimate a combustion chamber-wall temperature with high accuracy even though the condition of rotational speed NE during fuel-cut varies.

Figure 7:
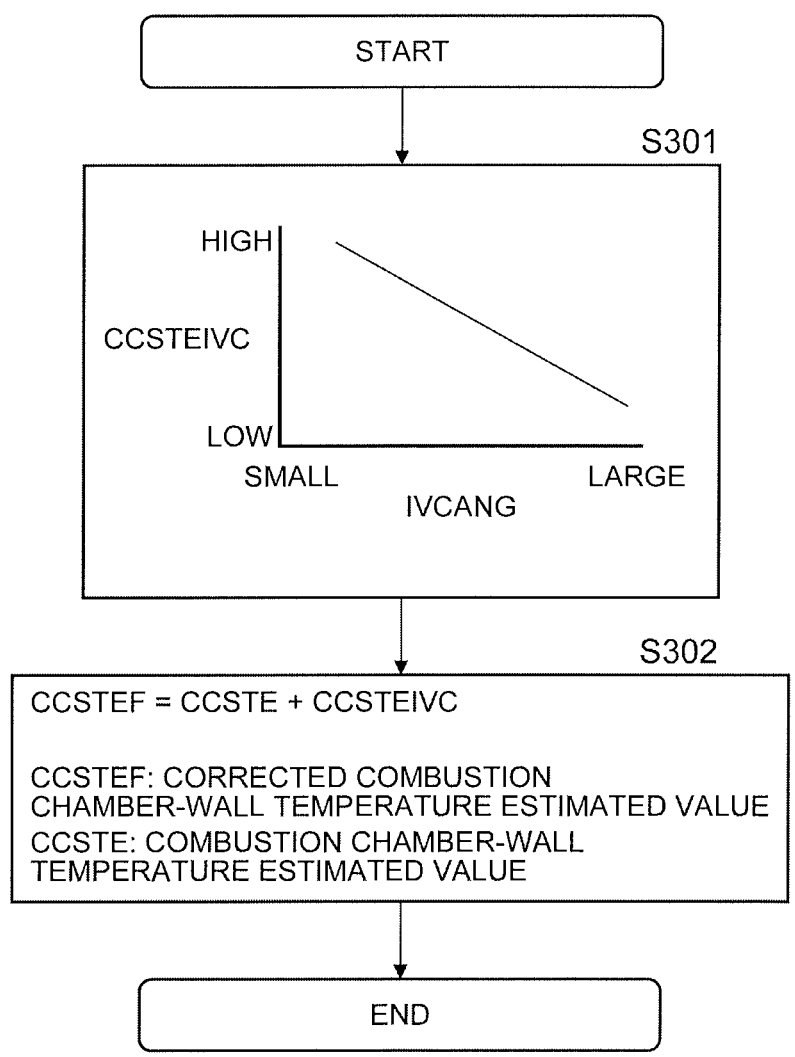
FIG. 7 is a flowchart illustrating processing for correcting an estimated value of a combustion chamber-wall temperature according to a closing timing IVC of an intake valve in the embodiment of the invention.

Furthermore, a flowchart of FIG. 7 illustrates processing for correcting wall temperature estimated value CCSTE according to a closing timing IVC of intake valve 7, which is made variable by valve timing control system 22, by engine control unit 31A.

In Step S301, engine control unit 31A sets a second correction value CCSTEIVC (CCSTEIVC (° C.)>0) based on a crank angle IVCANG (deg) between a bottom dead center BDC and closing timing IVC of intake valve 7.

The crank angle IVCANG means the absolute value of crank angle between bottom dead center BDC and closing timing IVC of intake valve 7, "IVCANG=0 deg" means that closing timing IVC corresponds to bottom dead center BDC, and as crank angle IVCANG is greater, the closing timing IVC of intake valve 7 moves away from bottom dead center BDC.

Here, engine control unit 31A corrects wall temperature estimate CCSTE to a greater value by setting second correction value CCSTEIVC to a greater value as crank angle IVCANG is smaller, that is, as closing timing IVC is closer to bottom dead center BDC.

The reason for the abovementioned correction is that it is difficult for a combustion chamber-wall temperature to be lowered during fuel-cut since the effective compression ratio of internal combustion engine 1 is higher and the heat of compression is higher in the compression stroke during fuel-cut as closing timing IVC is closer to bottom dead center BDC.

When engine control unit 31A sets second correction value CCSTEIVC in Step S301, the routine proceeds to Step S302 and engine control unit 31A sets the result of the addition of second correction value CCSTEIVC to wall temperature estimate CCSTE as a corrected estimated value CCSTEF (CCSTEF=CCSTE+CCSTEIVC) based on closing timing IVC.

Since engine control unit 31A corrects estimated value CCSTE according to closing timing IVC of intake valve 7 in this way, engine control unit 31A can estimate a combustion chamber-wall temperature with high accuracy even though the condition of closing timing IVC (effective compression ratio) during fuel-cut varies.

Figure 8:
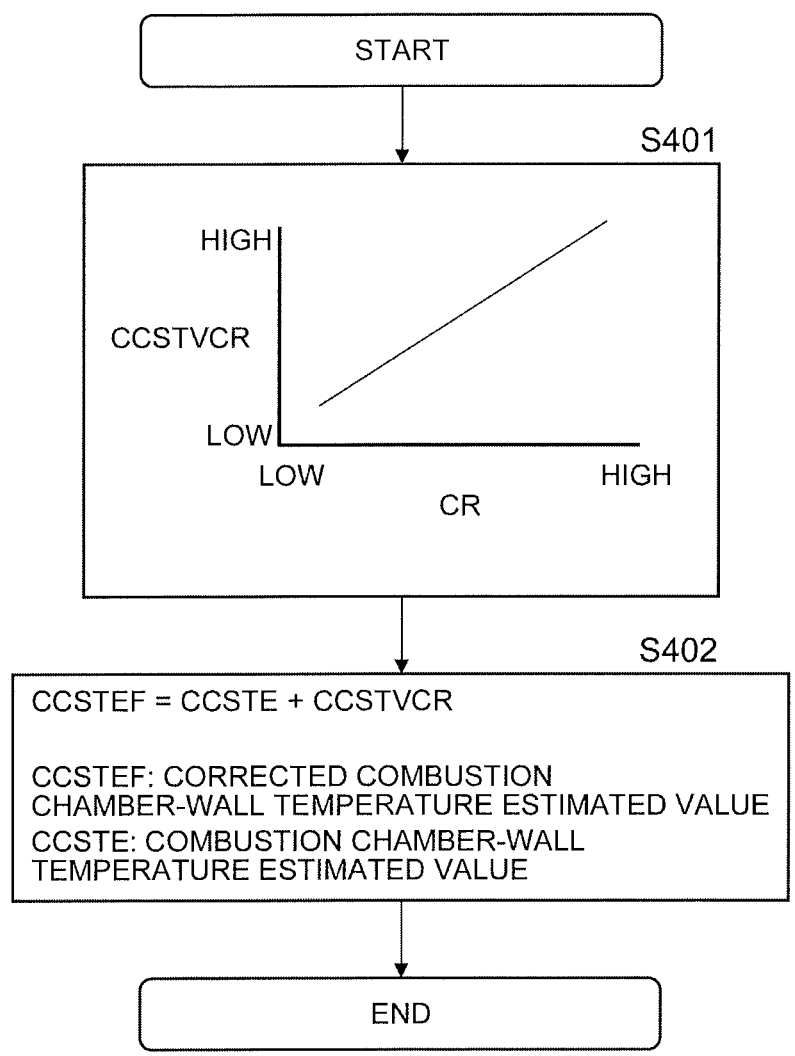
FIG. 8 is a flowchart illustrating processing for correcting an estimated value of a combustion chamber-wall temperature according to a mechanical compression ratio CR in the embodiment of the invention.

Furthermore, a flowchart of FIG. 8 illustrates processing for correcting wall temperature estimated value CCSTE according to a compression ratio (a mechanical compression ratio, the volume of the combustion chamber), which is made variable by variable compression ratio mechanism 23, by engine control unit 31A.

In Step S401, engine control unit 31A sets a third correction value CCSTVCR (CCSTVCR (° C.)>0) based on a compression ratio CR (a mechanical compression ratio, the volume of the combustion chamber, the rotational position of control shaft 29) that is made variable by variable compression ratio mechanism 23.

Here, engine control unit 31A corrects estimated value CCSTE to a greater value by setting third correction value CCSTVCR to a greater value as compression ratio CR is higher.

The reason for the abovementioned correction is that it is difficult for a combustion chamber-wall temperature to be lowered during fuel-cut since the heat of compression is higher in the compression stroke during fuel-cut as compression ratio CR (mechanical compression ratio) is higher.

When engine control unit 31A sets third correction value CCSTVCR in Step S401, the routine proceeds to Step S402 and engine control unit 31A sets the result of the addition of third correction value CCSTVCR to estimated value CCSTE as a corrected estimated value CCSTEF (CCSTEF=CCSTE+CCSTVCR) based on compression ratio CR.

Since engine control unit 31A corrects estimated value CCSTE according to compression ratio CR, which is made variable by variable compression ratio mechanism 23, in this way, engine control unit 31A can estimate a combustion chamber-wall temperature with high accuracy even though the condition of compression ratio CR (mechanical compression ratio) during fuel-cut varies.

Engine control unit 31A can perform all the correction of estimated value CCSTE using first correction value CCSTENE, the correction of estimated value CCSTE using second correction value CCSTEIVC, and the correction of estimated value CCSTE using third correction value CCSTVCR; and can correct estimated value CCSTE through the selection of any of first correction value CCSTENE, second correction value CCSTEIVC, and third correction value CCSTVCR.

The contents of the invention have been described in detail above with reference to the preferred embodiments, but it is apparent that one skilled in the art can obtain various kinds of modifications based on the basic technical concept and instruction of the invention.

The quantity of state, which is used to correct estimate CCSTE, is not limited to engine speed NE, closing timing IVC (effective compression ratio), and compression ratio CR (mechanical compression ratio) having been described above, and engine control unit 31A can correct estimated value CCSTE based on the temperature of intake air, the amount of cooling water circulating in the cylinder head, or the like.

In detail, engine control unit 31A can correct estimated value CCSTE to a smaller value as the temperature of intake air is lower; and can correct estimated value CCSTE to a smaller value as the amount of cooling water circulating in the cylinder head is larger.

Furthermore, under conditions in which the accuracy of the estimation of a combustion chamber-wall temperature is lowered in a case in which the transient operation of internal combustion engine 1 is repeated, or the like, engine control unit 31A can stop processing for correcting an ignition timing or the amount of fuel to be injected according to the results of the estimation of a combustion chamber-wall temperature; or can limit the correction allowance of the processing for correcting an ignition timing or the amount of fuel to be injected according to the results of the estimation of a combustion chamber-wall temperature.

Furthermore, in a case in which the supply of fuel to some cylinders is stopped as fuel-cut during the deceleration operation of internal combustion engine 1, engine control unit 31A can individually perform processing for estimating a combustion chamber-wall temperature in a cylinder in which the supply of fuel is stopped and a cylinder in which the supply of fuel is continued, and can estimate a combustion chamber-wall temperature in the cylinder in which the supply of fuel is stopped as in the embodiment.

Furthermore, in a cylinder-deactivation internal combustion engine that can switch an all-cylinder operation for all cylinders and stopping operation for some cylinders, engine control unit 31A can estimate the combustion chamber-wall temperature of a stopped cylinder by the same processing as that of the embodiment in a case in which the stopping operation is performed by stopping the supply of fuel while operations for opening and closing the intake and exhaust valves are continued in some cylinders.

Furthermore, in the control of a device for cooling internal combustion engine 1, a total amount of circulating cooling water, the switching of circulation paths, ratios of circulating cooling water in a plurality of paths, and the like can be controlled based on wall temperature estimated values.

REFERENCE SYMBOL LIST 1 internal combustion engine
4 piston
7 intake valve
15 ignition plug
22 valve timing control system
23 variable compression ratio mechanism
31A engine control unit
31B VCR control unit
31C VTC control unit
33 air flow sensor
37 water temperature sensor
41 ignition coil
45 fuel injection valve

The invention claimed is:

1. A control device for an internal combustion engine, comprising:
    a fuel-cut unit that performs fuel-cut for stopping supply of fuel to a combustion chamber in a deceleration operation of an internal combustion engine;
    a wall temperature estimating unit that estimates a wall temperature of the combustion chamber; and
    a combustion control unit that controls combustion of the internal combustion engine based on an estimated value of the wall temperature of the combustion chamber,
    the wall temperature estimating unit setting a difference between the wall temperature of the combustion chamber and a cooling water temperature according to an integrated value of an intake air amount of the internal combustion engine after start of the fuel-cut, and obtains the estimated value of the wall temperature of the combustion chamber during the fuel-cut based on the difference and the cooling water temperature.

2. The control device for an internal combustion engine according to claim 1,
    wherein the wall temperature estimating unit uses a difference between the estimate of the wall temperature of the combustion chamber at the time of start of the fuel-cut and the cooling water temperature as an initial value, and reduces the difference according to an increase in the integrated value.

3. The control device for an internal combustion engine according to claim 1,
    wherein the wall temperature estimating unit changes the estimated value of the wall temperature of the combustion chamber during the fuel-cut to a greater value as a rotational speed of the internal combustion engine is higher.

4. The control device for an internal combustion engine according to claim 1,
    wherein the internal combustion engine includes a variable valve device that varies opening and closing timings of an intake valve, and
    the wall temperature estimating unit changes the estimated value of the wall temperature of the combustion chamber during the fuel-cut to a greater value as the closing timing of the intake valve is closer to a bottom dead center.

5. The control device for an internal combustion engine according to claim 1,
    wherein the internal combustion engine includes a variable compression ratio device that adjusts a mechanical compression ratio by changing the volume of the combustion chamber, and
    the wall temperature estimating unit changes the estimated value of the wall temperature of the combustion chamber during the fuel-cut to a greater value as the mechanical compression ratio is higher.

6. A method of estimating a combustion chamber-wall temperature of an internal combustion engine, the method comprising:
    a step of measuring a cooling water temperature of an internal combustion engine;

a step of measuring an intake air amount of the internal combustion engine;

a step of estimating a wall temperature of a combustion chamber during a combustion operation of the internal combustion engine;

a step of performing fuel-cut for stopping supply of fuel to the combustion chamber in a deceleration operation of the internal combustion engine;

a step of obtaining a difference between an estimated value of the wall temperature of the combustion chamber at the time of start of the fuel-cut and the cooling water temperature;

a step of obtaining an integrated value of the intake air amount after the start of the fuel-cut;

a step of reducing data of the difference according to an increase in the integrated value; and a step of obtaining an estimated value of the wall temperature of the combustion chamber during the fuel-cut based on a measured value of the cooling water temperature and the data of the difference.

7. The method of estimating a combustion chamber-wall temperature of an internal combustion engine according to claim 6, further comprising:

a step of changing the estimated value of the wall temperature of the combustion chamber during the fuel-cut to a greater value as a rotational speed of the internal combustion engine is higher.

8. The method of estimating a combustion chamber-wall temperature of an internal combustion engine according to claim 6, wherein the internal combustion engine includes a variable valve device that varies opening and closing timings of an intake valve, and the method further comprising:

a step of changing the estimated value of the wall temperature of the combustion chamber during the fuel-cut to a greater value as the closing timing of the intake valve is closer to a bottom dead center.

9. The method of estimating a combustion chamber-wall temperature of an internal combustion engine according to claim 6, wherein the internal combustion engine includes a variable compression ratio device that adjusts a mechanical compression ratio by changing the volume of the combustion chamber, and the method further comprising:

a step of changing the estimated value of the wall temperature of the combustion chamber during the fuel-cut to a greater value as the mechanical compression ratio is higher.

* * * * *